April 29, 1930. F. C. ANDERSEN ET AL 1,756,720
SASH PULLEY
Filed Feb. 29, 1928
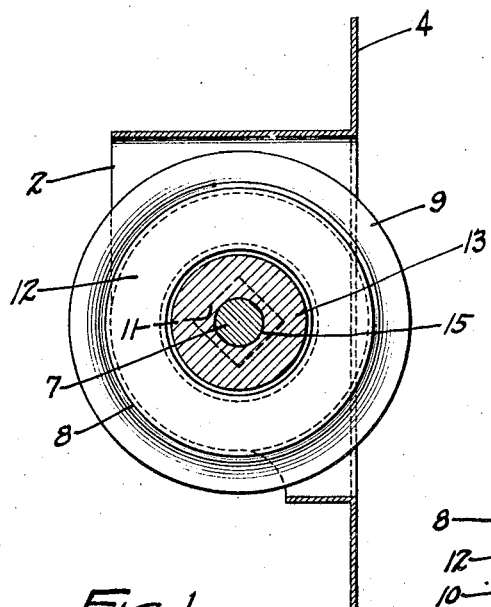
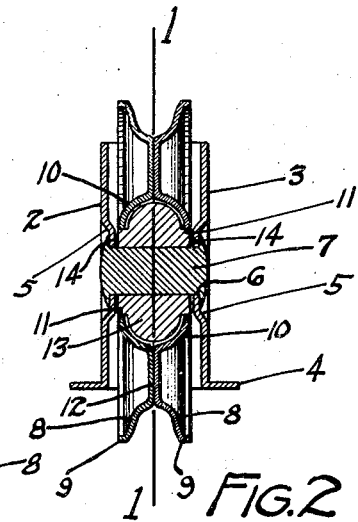
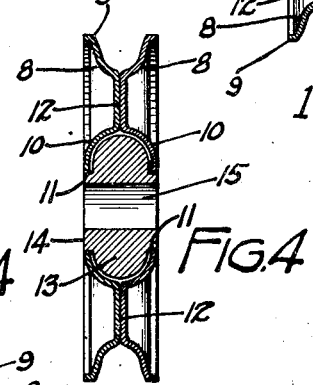
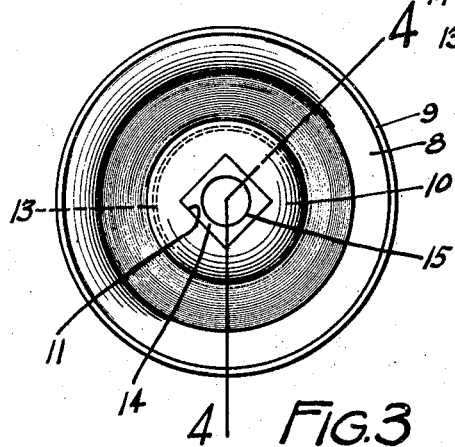
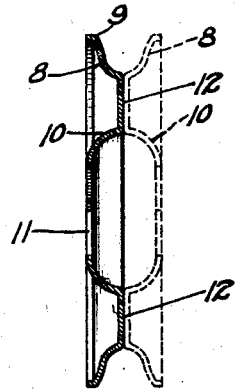
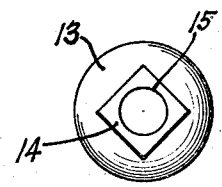
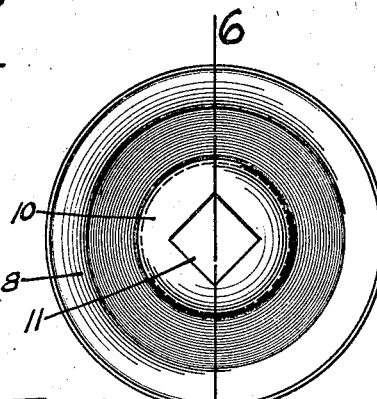
Inventors
FRED C. ANDERSEN
CLARENCE P. BIRD
By Paul, Paul & Moore
ATTORNEYS Patented Apr. 29, 1930

1,756,720

UNITED STATES PATENT OFFICE

FRED C. ANDERSEN AND CLARENCE P. BIRD, OF BAYPORT, MINNESOTA, ASSIGNORS, BY MESNE ASSIGNMENTS, TO ANDERSEN FOUNDRY COMPANY, OF BAYPORT, MINNESOTA, A CORPORATION OF MINNESOTA

SASH PULLEY

Application filed February 29, 1928. Serial No. 258,082.

The invention relates to a sash pulley made or formed of sheet metal, and the object of the invention is to provide a pulley wherein the operation of the sheave will be practically noiseless, provision being made to prevent contact of metal upon metal and thereby eliminate the annoying sound frequently incidental to the operation of sash pulleys as usually made.

A further object is to provide a sash pulley having a self-lubricating bearing to the end that wear and friction between the parts may be greatly reduced.

A further object is to provide a pulley of simple, inexpensive construction and one which will be strong and durable.

The invention consists generally in various constructions or combinations, all as hereinafter described, and particularly pointed out in the claims.

In the accompanying drawings forming part of this specification,

Figure 1 is a sectional view taken on the section line 1—1 of Figure 2;

Figure 2 is a transverse sectional view of the pulley;

Figure 3 is a side view of the pulley sheave removed from the housing showing the square orifice therein;

Figure 4 is a sectional view on the line 4—4 of Figure 3;

Figure 5 is a side view of the sheave removed from the housing showing the rectangular orifice therein;

Figure 6 is a sectional view on line 6—6 of Figure 5; and

Figure 7 is a side view of the bushing removed from the sheave.

In the drawing, 2 and 3 represent the opposite sections of the pulley housing both preferably made of sheet metal and having flanges 4 by means of which the pulley is secured within the recess of the window jamb, not shown. The housing sections are provided with concave or recessed portions 5 in which a central orifice 6 is formed to receive the rivet or pin 7 which forms the axis of the pulley sheave. The sheave of the pulley comprises oppositely arranged ring section members 8 having flaring or diverging outer edges 9 to form an annular groove to receive the sash weight cord, and also having diverging inner flanges 10 around the central rectangular orifice 11 of the sheave and the walls of the sheave sections intermediate the flaring inner and outer edges are arranged in abutting relation as indicated at 12 and firmly secured together by suitable means preferably spot welding. 13 represents a bushing of suitable fibrous material having a curved periphery that is adapted to fit between the flanges 10 of the sheave rings, and we prefer to provide rectangular sections 14 on each side of the bushing whereon the edges of said flanges 10 are seated. The engagement of these flanged edges 10 with the rectangular portions of the bushing will lock the bushing in the sheave and prevent it from turning therein and the sheave will also be held against turning on the bushing. A bore 15 is provided in the bushing to receive the rivet or pin 7 and the bushing is thoroughly impregnated with a lubricating agent and a substantially anti-friction surface will thereby be formed for contact with the surface of the pin 7. The rectangular sections 14 of the bushing protrude beyond the rounded surface that is engaged by the flanged edges 10 but are flush substantially with the outer faces of the said edges, and the faces of the sections 14 contact with the inner faces of the depressed portions 5 of the housing plates and any rubbing contact at this point will be between the faces of the plates and the fibrous wall of the bushing, thus producing a noiseless lubricating contact at this point.

In assembling the parts of the pulley, the bushing will first be inserted between the flanged flaring edges 10 of the sheave sections and the sections arranged back to back are secured together by suitable means as spot welding, and when this has been done, the sheave with the fibrous bushing therein will be inserted between the opposite plates of the housing, the rivet or pin 7 inserted through the openings in the plates and the orifice in the bushing, and the ends of the pin headed or upset to lock the opposite plates of the housing together. The depressions in the housing plates allow the ends of the rivet when headed, to be flush substantially with the faces of the plates, while the inner faces of these concave portions of the plates or depressions therein will be adjacent the faces of the bushing sufficiently near to prevent undue lateral motion of the sheave and still have a practically noiseless guiding contact therewith.

A sash pulley of this type can be conveniently made by stamping or pressing the parts from sheet metal of suitable gauge and made to assume the proper form or configuration by the use of suitable dies. The assembling of the parts can be expeditiously performed and when completed, a sash pulley will be produced of strong, durable construction, and one which will be practically noiseless during the opening or closing of a window sash.

We claim as our invention:

1. A sash pulley having a housing composed of oppositely arranged plates having recesses or depressions formed therein, and provided with orifices, a sheave composed of sheet metal rings having inwardly and outwardly flaring edges and a central opening, the walls of said ring members intermediate to said edges being secured together, a bushing of fibrous material having its outer portion fitting between the flanged inner edges of said sheave, said bushing having a central bore therethrough and provided on each side with lateral protruding sections whereon the flanged edges of said sheave are seated, the end faces of said sections being flush substantially with said flanged edges, the faces of said bushing sections opposing the inner faces of the depressions of said housing, and a pin passing through said housing plates and said bushing, and having its ends headed in the depressions of said housing plates.

2. A sash pulley having a housing composed of oppositely arranged plates and provided with orifices, a sheave composed of sheet metal rings having inwardly and outwardly flaring edges and a central opening, the walls of said ring members intermediate to said edges being secured together, a bushing of fibrous material having its outer portion fitting between the flanged inner edges of said sheave, said bushing having a central bore therethrough and provided on each side with lateral protruding sections whereon the flanged edges of said sheave are seated, the faces of said bushing section opposing the inner faces of said housing and a member passing through said housing plate and said bushing and forming an axis on which said sheave may turn.

In witness whereof, we have hereunto set our hands this 14th day of Feb. 1928.

FRED C. ANDERSEN.
CLARENCE P. BIRD.